Sept. 12, 1967  E. ZOLLER  3,340,688
SECONDS IMPULSE SENDING EFFECTED BY A CLOCKWORK
Filed May 18, 1965
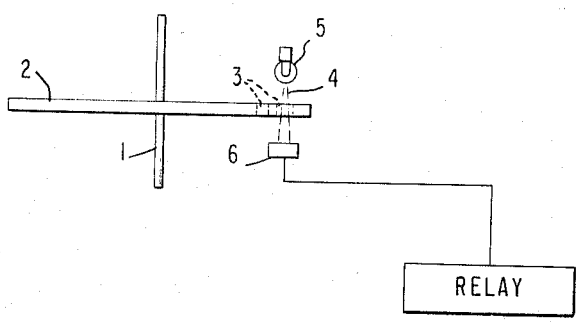
FIG.1
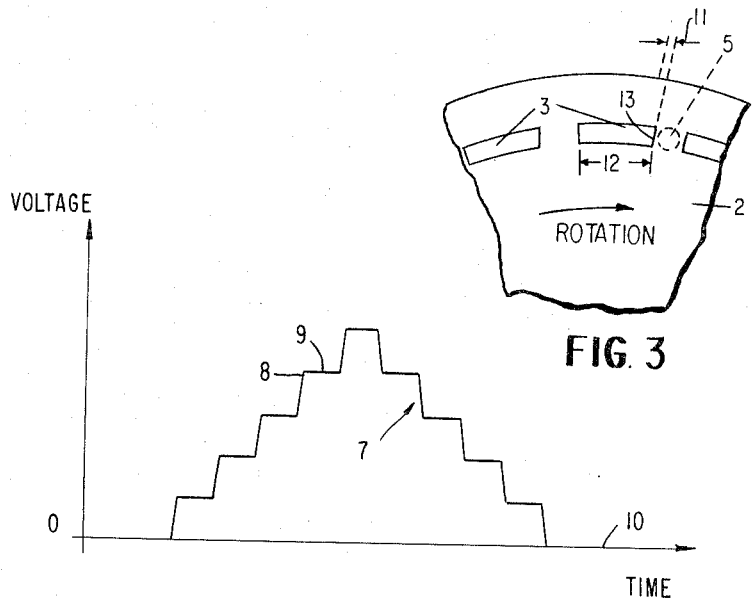
FIG. 3
FIG. 2
INVENTOR
EGON ZOLLER
BY (signature)
ATTORNEY

United States Patent Office 3,340,688
Patented Sept. 12, 1967

3,340,688
SECONDS IMPULSE SENDING EFFECTED
BY A CLOCKWORK
Egon Zoller, Lehensteig 11, Zurich, Switzerland
Filed May 18, 1965, Ser. No. 457,256
1 Claim. (Cl. 58—152)

ABSTRACT OF THE DISCLOSURE

Apparatus for transmitting time intervals to a relay comprising an apertured disc secured to the seconds wheel axle and moved thereby in short discrete steps. The apertures are circumferentially and uniformly spaced on the disc and the circumferential dimension of each aperture is several times the size of a discrete step. A light source is located on one side of the disc and a photocell is located on the other side in alignment with the light source. Since it takes a number of steps for an aperture to traverse the light source, the light intensity reaching the photocell varies in discrete steps and, therefore, the voltage generated by the photocell has a wave form which rises from minimum to maximum and falls therefrom to minimum in discrete steps.

---

The present invention relates to a photo-electric time-impulse counter for the transmission of second interval time impulses on the seconds wheel of clock-work motion and is designed to replace the mechanical time-impulse clock-work motions used heretofore.

The advance of the hour impulse wheel by mechanical advancing means and the advance of a day and night time wheel indicator presents no great problem because the load for movement is needed at widely spaced intervals. However, the axle mounting the seconds wheel of the ordinary clock-work mechanism is under constant motion and it is generally not desirable to impose an additional mechanical load which would be needed in transmitting seconds impulses. Mechanical linkages attached to the axle which might transmit these impulses, or attached to the wheel, would cause error in the rotation of the wheel thereby bringing about error in the time interval measurement of the seconds wheel.

The present invention obviates this difficulty by replacing the conventional seconds wheel by an apertured disc, and by positioning a light source on one side of the disc and a light sensitive electric cell means on the other side of the disc in alignment with the light source, whereby light passing from the source to the cell when an aperture aligns therewith generates a voltage in the cell to thereby actuate a relay means connected thereto. An aperture is provided for each second interval, the apertures being circumferentially arranged and uniformly spaced on the disc.

The invention will be more clearly understood by reference to the attached drawing in which there is shown, in—

FIG. 1 illustrates the seconds impulse generating assembly;

FIG. 2 illustrates a graph on voltage-time axes showing the development of the voltage wave in the light cell as an aperture traverses the light source; and FIG. 3 is a detail view of a portion of the disc, and shows the relation between an aperture, a discrete step movement of the disc, and the light source.

Referring to the drawing, a disc 2 is secured to seconds axle 1. A series of apertures 3, corresponding to the number of time intervals desired to be transmitted per a single rotation of the disc, are circumferentially arranged and uniformly spaced in disc 2, as shown in FIG. 3. A light source 5 is located on one side of disc 2, at the region of the apertures. A light sensitive electric cell means 6 is locatd on the other side of the disc in alignment with light source 5. As shown in FIG. 1, light rays 4 emanating from light source 5 fall on call means 6 to energize it when permitted by apertures 3. Cell member 6 when energized by the light rays generates an electric current which may be used to control the operation of a relay means connected thereto.

The clockwork (not shown) operates to turn seconds axle 1 in short discrete steps or movements, a well known motion for the second wheel in clocks. Each discrete step is much smaller than the circumferential dimension of an aperture 3, so that it takes several discrete steps of disc 2 for an aperture 3 to traverse light source 5. This relationship is shown in FIG. 3, wherein the dimension marked 11 represents a discrete step and the dimension marked 12 represents the circumferential dimension of an aperture 3. Consideration of FIG. 3 clearly shows that dimension 12 is several times the dimension 11. Thus, disc 2 makes a definite number of discrete steps 11 to carry aperture 3 across the light source 5.

The above relationship of the sizes of a discrete step and an aperture results in a generation of a voltage of a stepped wave form 7 shown in FIG. 2. Since the movement of axle 1 is not in a continuous rotary form, but in short discrete steps, the voltage generated is in steps as shown in FIG. 2, wherein 10 represents movement of disc 2, that is, time. As will be observed from FIG. 3, assuming clockwise rotation of disc 2, leading edge 13 of aperture 3 approaches light source, and in the next discrete step it will uncover it but permit very little light to fall on cell 6. Thus, the voltage generated in cell 6 rises from 0 to the first step of FIG. 2, a rise represented by a step 8. Since there is a pause of disc 2 between each discrete step, the voltage rise will form a level portion 9. The next rotational discrete step of disc 2 causes slot 3 to traverse more of light source 5, and thereby permit a greater light intensity to fall on cell 6 with a consequent generation of a further voltage rise, as shown in FIG. 2. FIG. 2 shows five steps for the voltage of wave 7 to rise to the maximum and five steps to fall to zero. In the wave form shown in FIG. 2 it would take 11 discrete steps of disc 2 to cause an aperture 3 to complete traverse light source 5, the maximum voltage rise taking place when light source 5 is in the center of dimension 12 of an aperture 3.

The above sizes are merely illustrative, and other various dimensions and ratios of discrete steps and apertures may be used to attain any desired number of steps in the voltage wave.

The current generated in cell 6 may be used to energize any well known relay device, which in turn may control any desired instrumentality for recording the time interval.

An example of such a relay is the well known multivibrator which is energized when the voltage impressed thereon reaches a predetermined value and deenergized when the voltage decreases.

The embodiments of the invention in which an exclusive property or privilege is claimed are defined as follows:

In a clockwork, time period indicating means comprising a seconds-wheel axle turning in discrete short steps, a disc secured to said axle to turn therewith, circumferentially arranged and uniformly spaced apertures in said disc, a source of light located on one side of said disc at the region of said apertures, light sensitive electric cell means located on the other side of the disc in alignment with the light source, each discrete step being much shorter than the circumferential dimension of each aperture so that a plurality of steps is necessary to completely move an aperture past the light source, thereby exposing the cell means to the light beam in discrete intensities to cause the cell to generate a voltage which varies from a minimum to a maximum and then back to the minimum in steps, and relay means responsive to the generated voltage.

References Cited

UNITED STATES PATENTS

| | | | |
|---|---|---|---|
| 1,971,086 | 8/1934 | Trouant | 58—24 |
| 2,708,720 | 5/1955 | Anderson | 331—111 |

FOREIGN PATENTS

| | | |
|---|---|---|
| 1,198,800 | 12/1959 | France. |
| 1,344,312 | 10/1963 | France. |

RICHARD B. WILKINSON, *Primary Examiner.*

GERALD F. BAKER, *Examiner.*